H. F. BRANZELL.
WROUGHT IRON RIBBED PIPE.
APPLICATION FILED APR. 10, 1918.

1,284,578.

Patented Nov. 12, 1918.

Inventor
H. F. Branzell

UNITED STATES PATENT OFFICE.

HJALMAR F. BRANZELL, OF LIMHAMN, SWEDEN.

WROUGHT-IRON RIBBED PIPE.

1,284,578.  Specification of Letters Patent.  Patented Nov. 12, 1918.

Application filed April 10, 1918. Serial No. 227,781.

*To all whom it may concern:*

Be it known that I, HJALMAR FERDINAND BRANZELL, civil engineer, a citizen of the Kingdom of Sweden, and residing at Limhamn, Sweden, have invented new and useful Improvements in Wrought-Iron Ribbed Pipes, of which the following is a clear and exact specification.

My invention relates to means for increasing the effect of wrought iron ribbed pipes of that kind by which the ribs in screw form are wound and pressed on the pipe in a known way by means of special machines. The novelty of my invention consists in pressing the pipes before the applying of the ribs to an oval or elliptical cross section as to increase the active surface of the pipes. A further object of my invention is to provide such elliptical pipes with cylindrical ends in a certain manner specified in the following for the purpose of facilitating the connection of the pipes and obtaining an even incline of the inside bottom surface, thereof.

Reference is to be had to the accompanying drawing, in which:—

Figure 1:
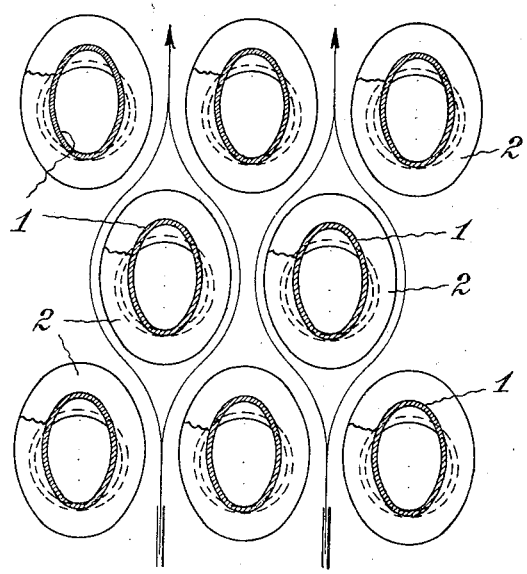
Figure 2:
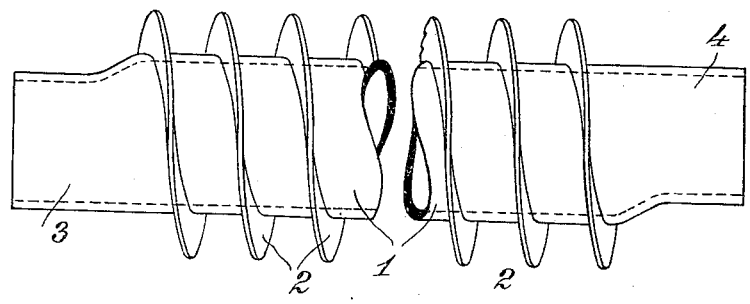

Figure 1 shows a set of ribbed pipes according to my invention as placed in a common radiator and seen in vertical cross section. Fig. 2 shows a side elevation of a single pipe and especially the ends thereof.

According to my invention the pipes 1 before the applying of the ribs are given an elliptical cross section for instance as shown in Fig. 1 and thereafter the ribs 2 in form of a wrought iron strip are wound edgewise around the pipe and fixed thereto in a known way. The elliptical cross section of the pipe can be provided by a corresponding pressing of a cylindrical pipe, but pipes which from the beginning are given an elliptical cross section may also be used.

According to the invention the longer axis of the elliptical cross section is to be placed in the flowing direction of the outer medium to be heated or cooled, as shown by the arrows in Fig. 1, and thus said medium has to pass a greater surface of the pipes and comes more closely in contact therewith because the pipes can be placed nearer to each other, and consequently the effect is increased.

Because of the elliptical cross section the pipes cannot easily be connected to each other or to any suitable connecting member by means of usual flanges or screw threads, and therefore the ends of the pipes may preferably be given a circular cross section as to permit such a usual form of connections. Said circular form of the pipe ends are obtained by pressing and if using a pipe the form of which is cylindrical from the beginning the main middle part only is pressed to an elliptical cross section while the ends of the pipe are left unpressed. If using a pipe the form of which from the beginning is elliptical the ends of it are pressed to a circular cross section.

If the pipes are to be used for heating purposes by means of a medium which by cooling is condensed to a liquid as for instance steam the cylindrical ends 3 and 4 of the pipes are arranged in such a way that the lower part of one of the ends, for instance 3, is on the level with the bottom surface of the pipe and the upper part of the other end 4 is on the level with the top surface of the same as shown in Fig. 2. By this arrangement the condensed water can run away from the pipe through the lower end of it and water still standing within the pipes is avoided. The steam however passes above the water surface either upward through the other end or downward through the same end as the water.

Having now fully described my invention I declare that what I claim is:—

An apparatus of the character described, comprising a plurality of pipes having their longitudinal axes substantially parallel, said pipes being substantially elliptical in cross section with the longitudinal axes of the ellipses arranged substantially parallel with the direction of travel of the fluid medium exteriorly of the pipes, said pipes being provided at their ends with cylindrical extensions, the cylindrical extensions at corresponding ends of the pipes being arranged at the top of the pipes and the cylindrical extensions at the opposite corresponding ends of the pipes being arranged at the bottoms of said pipes, whereby a liquid condensed within said pipes will drain from the lower ends thereof; and spiral ribs carried by said pipes, said ribs having their turns substantially elliptical with the longitudinal axes of the same disposed substantially parallel with the direction of flow of the said fluid medium.

In testimony whereof, I have signed my name to this specification, in the presence of two subscribing witnesses.

HJALMAR F. BRANZELL.

Witnesses:
FRED FLERON,
A. W. ANDERSON.